United States Patent
Brush et al.

(10) Patent No.: US 10,112,515 B2
(45) Date of Patent: Oct. 30, 2018

(54) FLEX SHIELD FOR SEAT ASSEMBLY

(71) Applicant: Magna Seating Inc, Aurora (CA)

(72) Inventors: Timothy J Brush, West Bloomfield, MI (US); Whitney Jones, South Lyon, MI (US); Gary Kopec, Harrison Township, MI (US); Alan Proulx, West Bloomfield, MI (US); Tyler Bandurski, Rochester, MI (US)

(73) Assignee: Magna Seating Inc., Aurora, Ontario (CA)

( * ) Notice: Subject to any disclaimer, the term of this patent is extended or adjusted under 35 U.S.C. 154(b) by 0 days.

(21) Appl. No.: 15/082,115

(22) Filed: Mar. 28, 2016

(65) Prior Publication Data

US 2016/0280108 A1     Sep. 29, 2016

Related U.S. Application Data (60) Provisional application No. 62/139,165, filed on Mar. 27, 2015.

(51) Int. Cl.
| | |
|---|---|
| *B60N 2/60* | (2006.01) |
| *B60N 2/22* | (2006.01) |
| *B60N 2/16* | (2006.01) |

(52) U.S. Cl.
CPC .......... *B60N 2/6063* (2013.01); *B60N 2/16* (2013.01); *B60N 2/22* (2013.01)

(58) Field of Classification Search
CPC ........... B60N 2/6063; B60N 2/16; B60N 2/22
USPC ..... 297/463.1, 463.2, 354.12, 184.17, 184.1, 297/184.11, 184.14, 184.15
See application file for complete search history.

(56) References Cited

U.S. PATENT DOCUMENTS

| | | | | | |
|---|---|---|---|---|---|
| 2,782,839 | A | * | 2/1957 | Cole ................ | A47D 15/006 297/228.12 |
| 3,278,226 | A | * | 10/1966 | Magnusson .......... | A47C 27/15 297/180.11 |
| 4,810,015 | A | * | 3/1989 | McNeil ................ | B60R 13/04 150/166 |

(Continued)

FOREIGN PATENT DOCUMENTS

| | | | | |
|---|---|---|---|---|
| DE | 202011000018 U1 | * | 5/2011 | ............. A47C 31/11 |
| JP | 09104269 | | 4/1997 | |

(Continued)

*Primary Examiner* — David R Dunn
*Assistant Examiner* — Tania Abraham
(74) *Attorney, Agent, or Firm* — Miller Canfield (57) ABSTRACT

A flex shield operatively coupled to a seat assembly of an automotive vehicle for concealing a portion of the seat assembly. The flex shield comprising a flexible planar body portion extending laterally between a front edge and a rear edge and vertically between an upper edge and a lower edge. A plurality of elastic straps are fixedly secured to the body portion and adapted to be coupled to the seat assembly for maintaining tension on the flexible body portion. A plurality of pre-formed fold lines are formed in the body portion and extend between at least one of the front edge and rear edge for consistently controlling folding motion of the body portion between an unfolded position defining a generally planar body portion and a folded position wherein the body portion is collapsed along the fold lines.

13 Claims, 7 Drawing Sheets

(56) References Cited

U.S. PATENT DOCUMENTS

| | | | | |
|---|---|---|---|---|
| 4,986,591 A * | 1/1991 | Martienssen | | B60N 2/045 248/421 |
| 5,007,674 A * | 4/1991 | Franc | | A47D 15/00 297/184.13 |
| 5,265,292 A * | 11/1993 | Underell | | A47C 4/52 297/380 |
| 5,362,131 A * | 11/1994 | Susko | | B60N 2/4613 16/250 |
| 5,421,614 A * | 6/1995 | Zheng | | B60R 22/024 280/801.1 |
| 6,076,577 A * | 6/2000 | Ontaneda | | B60J 11/08 150/168 |
| 6,155,637 A * | 12/2000 | Waters | | A47C 31/113 297/188.01 |
| 6,623,061 B2 * | 9/2003 | Tourangeau | | B60N 2/3013 296/63 |
| 6,644,736 B2 * | 11/2003 | Nguyen | | B64D 11/06 160/84.07 |
| 6,648,410 B2 * | 11/2003 | Sparks | | B60N 2/6036 297/228.1 |
| 7,029,063 B2 * | 4/2006 | Holdampf | | B60N 2/206 296/65.05 |
| 7,201,426 B2 * | 4/2007 | Villeminey | | B60N 2/3011 296/65.09 |
| 7,237,846 B1 * | 7/2007 | Arima | | B60N 2/6009 297/452.18 |
| 7,240,964 B2 * | 7/2007 | Riley | | A47C 31/11 297/219.1 |
| 7,261,375 B2 * | 8/2007 | Godshaw | | A01K 1/0272 119/28.5 |
| 7,287,813 B2 * | 10/2007 | Aliev | | B60R 11/00 119/771 |
| 7,611,186 B2 * | 11/2009 | Metzikis | | B62J 17/02 180/68.1 |
| 7,665,804 B1 * | 2/2010 | Jeffrey | | A47C 7/386 297/219.1 |
| 8,011,732 B2 * | 9/2011 | Lindsay | | B60N 2/10 297/452.38 |
| 8,287,048 B2 * | 10/2012 | Smith | | B60N 2/3031 297/452.38 |
| 8,414,071 B2 * | 4/2013 | Rabson | | A47C 31/113 297/228.12 |
| 8,485,583 B2 * | 7/2013 | Mather | | B60N 2/3075 296/37.14 |
| 8,944,504 B2 * | 2/2015 | Zimmerman, II | | B60N 2/3013 297/284.6 |
| 8,960,803 B2 * | 2/2015 | Mita | | B60N 2/22 297/354.12 |
| 9,399,409 B2 * | 7/2016 | Rdzanek | | B60N 2/02 |
| 2002/0096919 A1 * | 7/2002 | Sparks | | B60N 2/6036 297/228.12 |
| 2006/0012228 A1 * | 1/2006 | Bardouche | | A47C 31/11 297/228.12 |
| 2007/0138831 A1 * | 6/2007 | Carter | | B60J 11/025 296/152 |
| 2008/0164739 A1 * | 7/2008 | Valasin | | B60N 2/01583 297/325 |
| 2008/0224524 A1 * | 9/2008 | Mather | | B60N 2/3011 297/378.1 |
| 2009/0028466 A1 * | 1/2009 | Bailey | | A45F 4/12 383/4 |
| 2009/0091165 A1 * | 4/2009 | Thompson | | A47C 31/11 297/228.12 |
| 2011/0285164 A1 * | 11/2011 | Hogan | | B60J 11/08 296/95.1 |
| 2012/0181826 A1 * | 7/2012 | Sosnowski | | B60N 2/002 297/217.1 |
| 2015/0264887 A1 * | 9/2015 | Parness | | A01K 1/0272 297/180.14 |

FOREIGN PATENT DOCUMENTS

| | | | |
|---|---|---|---|
| JP | 09104269 A | * | 4/1997 |
| JP | 10109578 | | 4/1998 |
| JP | 10109578 A | * | 4/1998 |

* cited by examiner

FLEX SHIELD FOR SEAT ASSEMBLY

CROSS-REFERENCE TO RELATED APPLICATIONS

This application claims priority to U.S. Provisional Application No. 62/139,165, filed on Mar. 27, 2015 and entitled "Flex Shield."

BACKGROUND OF THE INVENTION

1. Field of the Invention

The present invention relates to a seat assembly for an automotive vehicle, and more particularly, to a flex shield operatively coupled to the seat assembly to conceal the sides of the seat assembly while consistently folding and unfolding with movement of the seat assembly between various seat positions.

2. Description of Related Art

Automotive vehicles include seat assemblies for supporting occupants within the vehicle. The seat assemblies typically include a seat cushion and a seat back operatively coupled to the seat cushion by a recliner mechanism for allowing selective pivotal adjustment of the seat back relative to the seat cushion between a plurality of reclined seating positions. The seat back is also commonly moveable between any one of the reclined seating positions and a generally horizontal fold flat position overlying the seat cushion to present a load floor surface on the back of the seat back.

It is also known in the automotive seating art to mount a riser assembly between the seat cushion and the floor of the vehicle for moving the seat assembly between a seating position, with the seat back in one of the reclined seating positions and the seat cushion spaced above the floor, and a stowed position, with the seat back in the fold flat position and the seat assembly stowed against, or within a recess in, the floor of the vehicle. The riser assembly may also provide for movement of the seat assembly between various other kneeling and easy-entry positions as is commonly known in the art.

However, the riser assembly supports the seat assembly spaced vertically above the floor of the vehicle exposing the sides of the seat assembly below the seat cushion and the mechanism of the riser assembly, thereby creating an unfinished appearance and potentially subjecting the riser assembly to debris and obstructions.

Therefore, it is desirable to provide a shield for covering the sides of the seat assembly while being flexible and movable with the seat assembly to maintain its integrity and appearance in the various seat positions.

SUMMARY OF THE INVENTION

According to one aspect of the invention, a flex shield is adapted to be operatively coupled to a seat assembly of an automotive vehicle for concealing a portion of the seat assembly. The flex shield comprises a flexible planar body portion extending laterally between a front edge and a rear edge and vertically between an upper edge and a lower edge. A plurality of elastic straps are fixedly secured to the body portion and adapted to be coupled to the seat assembly for maintaining tension on the flexible body portion. A plurality of pre-formed fold lines are formed in the body portion and extend between at least one of the front edge and rear edge for consistently controlling folding motion of the body portion between an unfolded position defining a generally planar body portion and a folded position wherein the body portion is collapsed along the fold lines.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE EMBODIMENTS

Figure 1:
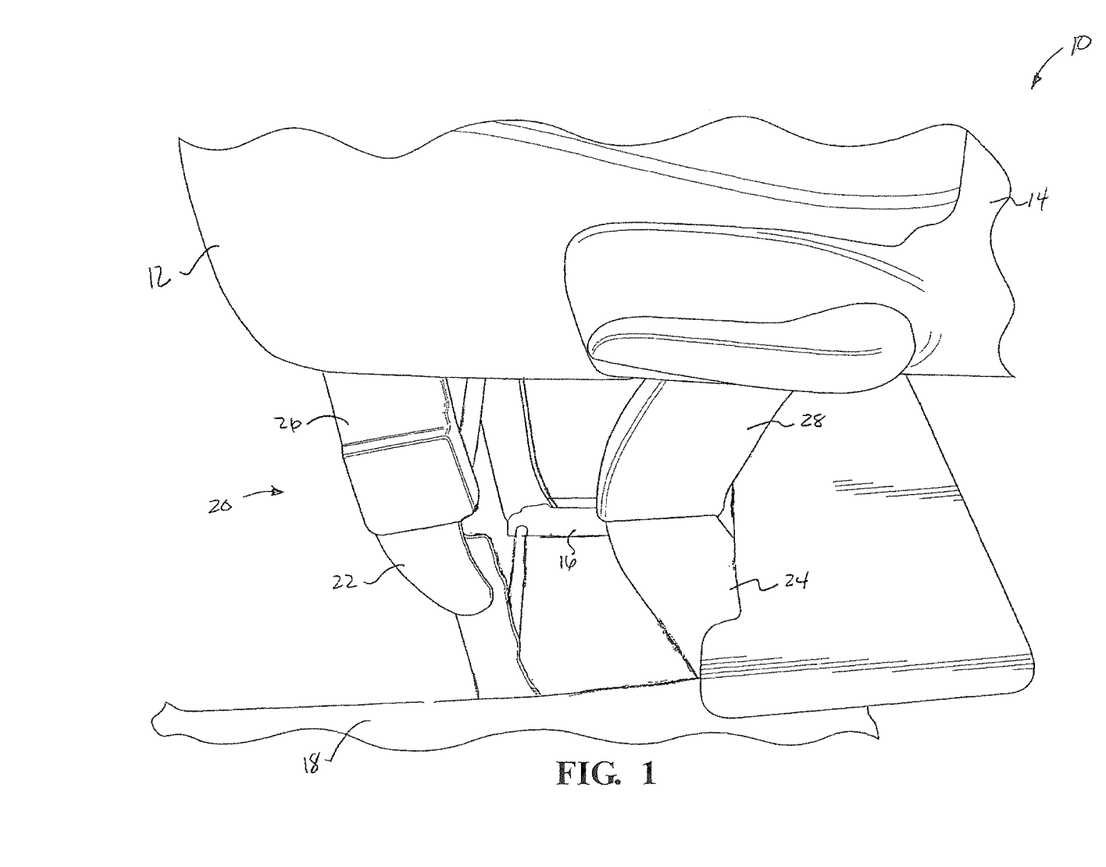
FIG. 1 is fragmentary perspective view of a vehicle seat assembly including a seat back operatively coupled to a seat cushion in a seating position and a riser assembly operatively mounting the seat assembly to the floor of the vehicle.
Figure 2:
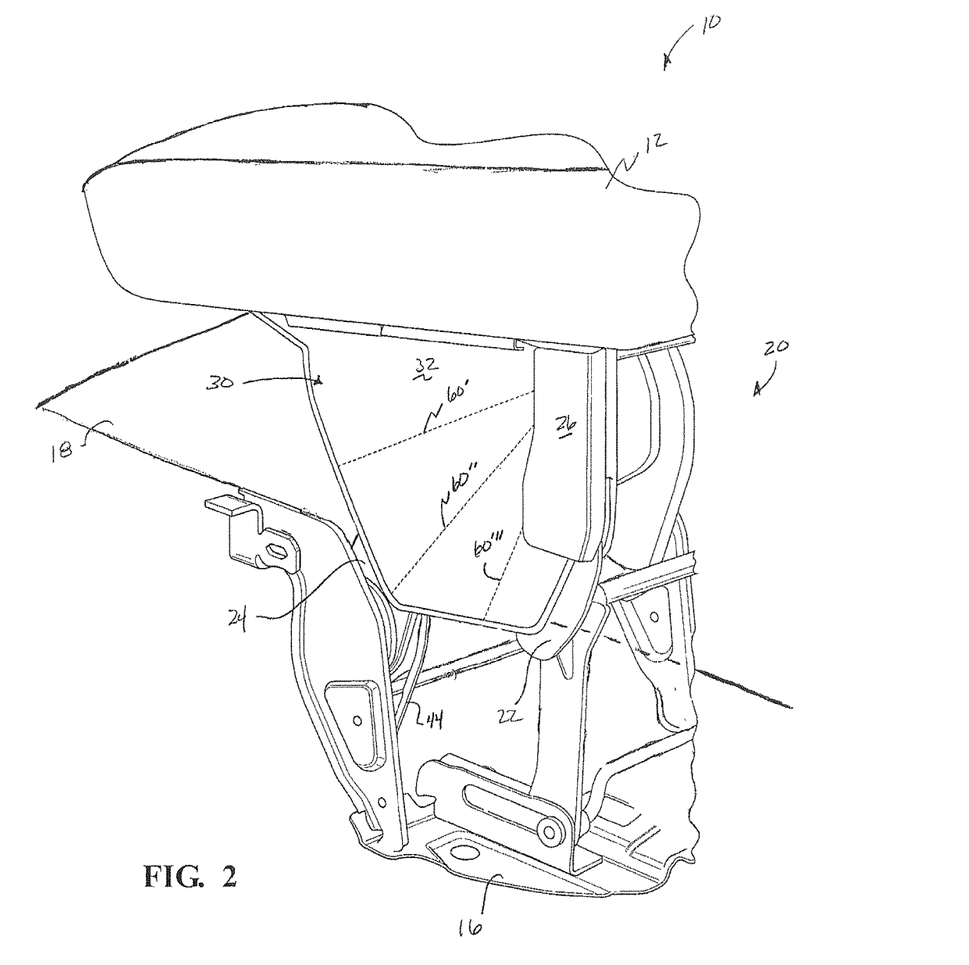
FIG. 2 is a fragmentary perspective view of a flex shield operatively coupled to the seat assembly in the unfolded position.
Figure 7:
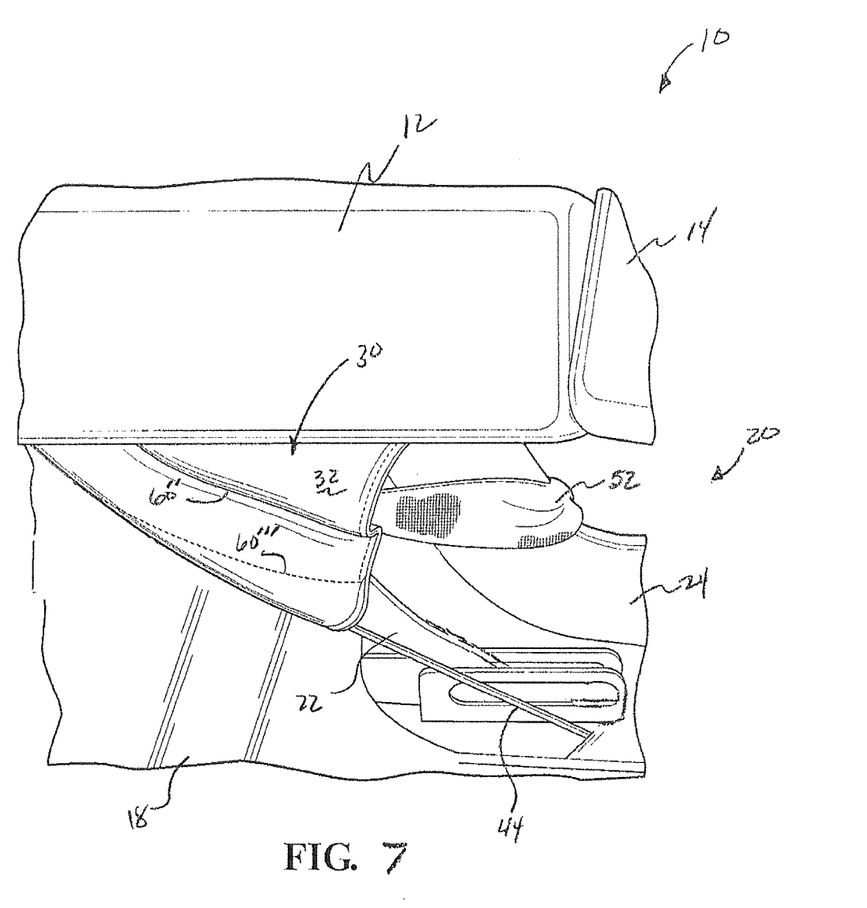
FIG. 7 is a fragmentary side view of the seat assembly in an easy-entry position and the flex shield in a partially folded position.
Figure 8:
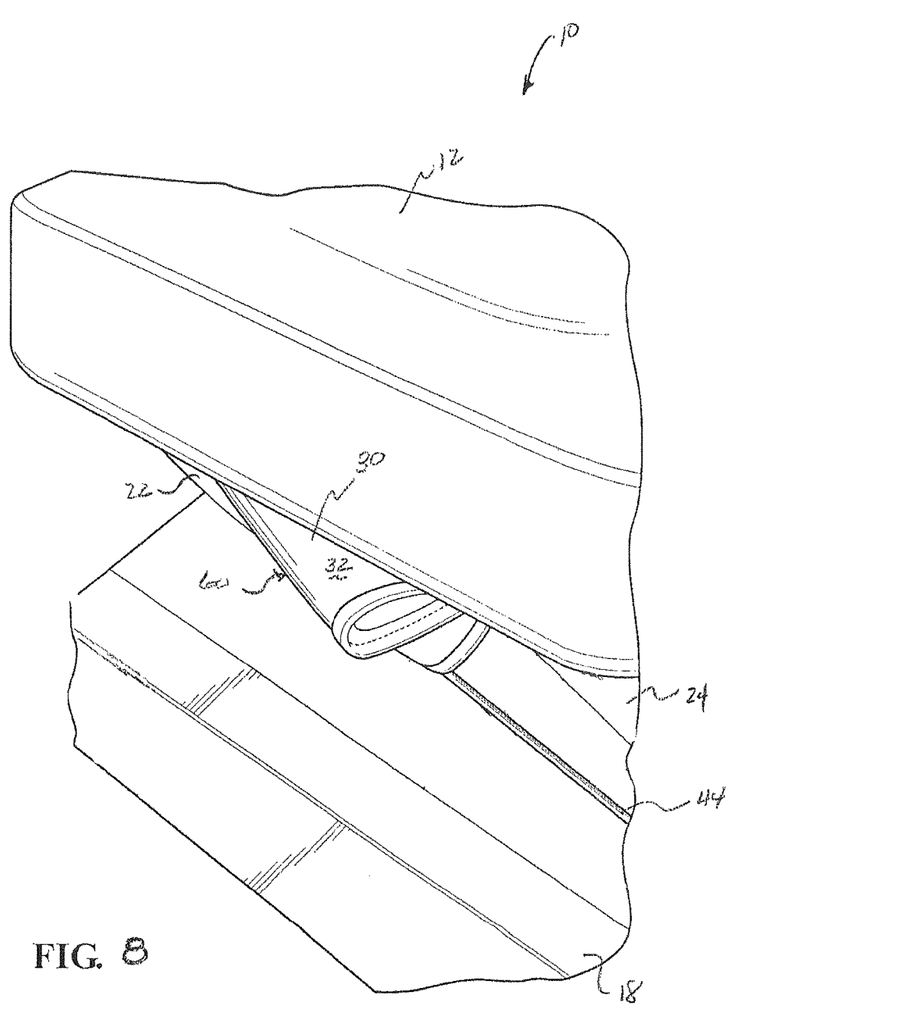
FIG. 8 is a fragmentary side view of the seat assembly in the easy-entry position and the flex shield in a fully folded position.

Referring to the Figures, wherein like numerals indicate like or corresponding parts throughout the several views, a seat assembly for use in an automotive vehicle is generally shown at 10. Referring to FIG. 1, the seat assembly 10 is shown in an upright seating position and includes a generally horizontal seat cushion 12 and a generally upright seat back 14 pivotally coupled to the seat cushion 12 by a pair of recliner assemblies (not shown) as is commonly known in the art. The recliner assembly is selectively operable between a locked condition and an unlocked condition allowing pivotal movement of the seat back 14 relative to the seat cushion 12 between an upright seating position, a plurality of reclined seating positions, and a forwardly pivoted fold flat position overlying the seat cushion 12. The seat assembly 10 is operatively coupled to and supported above a floor 18 in the vehicle by a riser assembly 20. The riser assembly 20 provides for actuation and movement of the seat assembly 10 between one of the seating positions spaced above the floor 18 of the vehicle, as shown in FIGS. 1 and 2, and an easy entry position tilted forwardly and downwardly towards the floor 18 of the vehicle to allow easier access into the vehicle and behind the seat assembly 10, as shown in FIGS. 7 and 8. The seat assembly may also be actuated to a stowed position recessed within a bin or compartment below the floor 18 of the vehicle as is commonly known in the art.

The riser assembly 20 includes a pair of front legs 22 having a first end pivotally coupled to the seat cushion 12 and an opposite second end pivotally coupled a mounting plate 16 for securing the seat assembly 10 to the floor 18 or directly to the floor 18 of the vehicle. The riser assembly 20 further includes a pair of rear legs 24 having a first end pivotally coupled to the seat cushion 12 and an opposite second end pivotally coupled to the mounting plate 16 for securing the seat assembly 10 to the floor 18 or directly to the floor 18 of the vehicle. The front and rear legs 22, 24 allow the movement of the seat assembly 10 between the seating position and the easy-entry or stowed positions. The upper portion of each of the front and rear legs 22, 24 may be at least partially covered by plastic covers or shields 26, 28, respectively, to conceal the legs, 22, 24 and provide a finished appearance to the seat assembly 10.

However, since the riser assembly 20 supports the seat assembly 10 spaced above the floor 18 of the vehicle, the sides of the seat assembly 10 below the seat cushion 12 are open creating an unfinished appearance and subjecting the riser assembly 20 to debris, obstruction and unwanted visibility. Therefore, the subject invention relates to a flex shield 30 operatively coupled to the seat assembly 10 for covering the opposite inboard and outboard sides of the seat assembly 10 both in the seating position and the easy-entry or stowed positions.

Referring to FIG. 2 the flex shield 30 is shown coupled to one side of the seat assembly 10 in the upright seating position covering the open sides of the seat assembly 10 below the seat cushion 12 and the front and rear legs 22, 24 extending and exposed above the floor 18 of the vehicle. It should be appreciated that a flex shield 30 is operatively coupled to each opposing inboard and outboard side of the seat assembly 10, however, only one side and flex shield is described in detail herein. The flex shield 30 is preferably made of a flexible fabric material of cloth, vinyl or leather and may be colored to match the color of the seat assembly 10.

Figure 5:
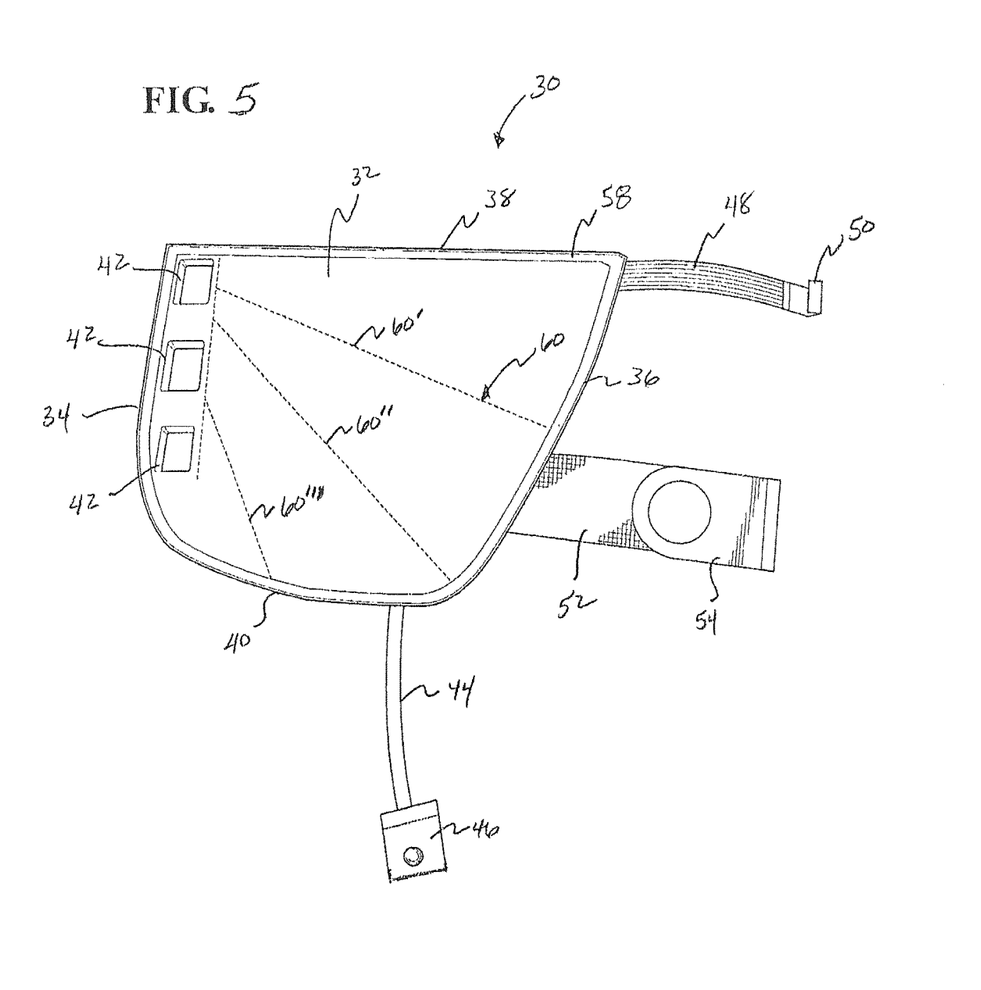
FIG. 5 is a front side view of the flex shield.
Figure 6:
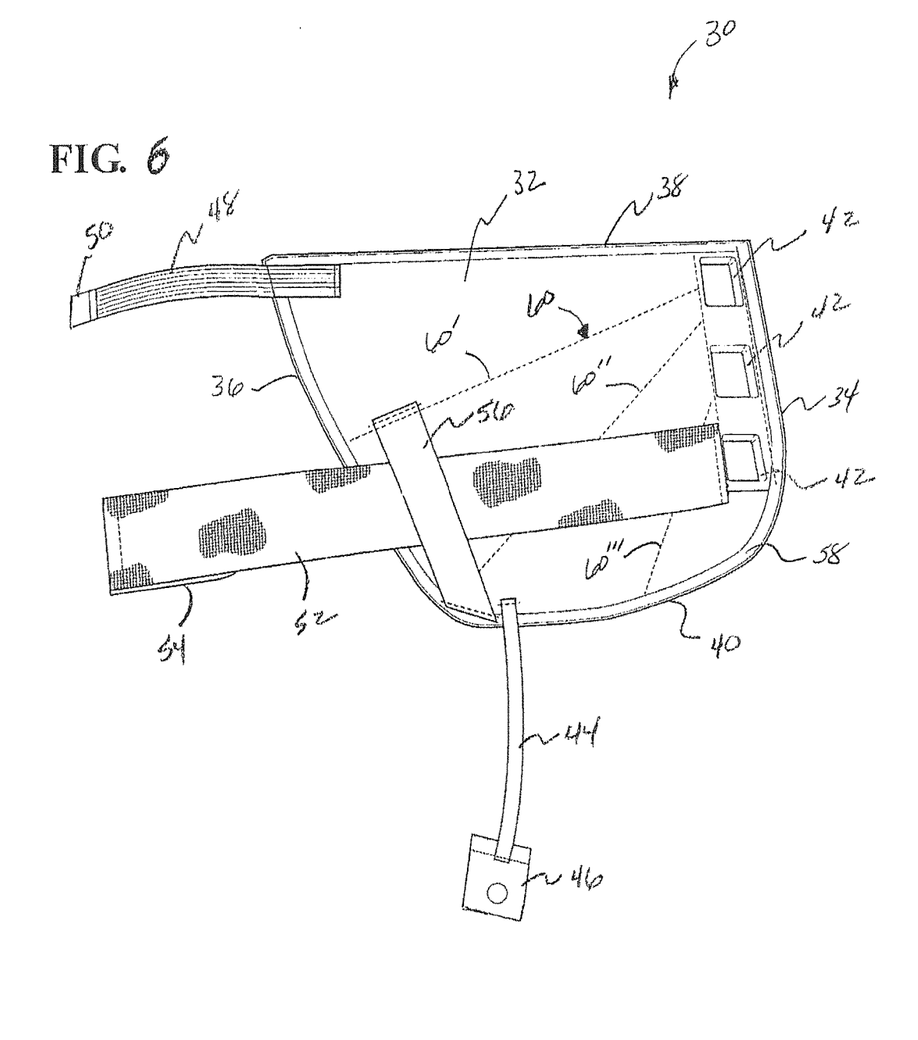
FIG. 6 is a rear side view of the flex shield.

Referring to FIGS. 5 and 6, the flex shield 30 is shown prior to attachment to the seat assembly 10. The front side of the flex shield 30 is shown in FIG. 5 and the back side is shown in FIG. 6. The flex shield 30 includes a main body portion 32 of flexible material of any desired size and shape suitable for covering and concealing the open sides of the seat assembly 10 and riser assembly 20. The body portion 32 extends laterally between a front edge 34 and a rear edge 36 and vertically between a top edge 38 and bottom edge 40. A plurality of openings 42 extend through the body portion 32 adjacent the front edge 34 for fixedly attaching and securing the body portion 32 of the flex shield 30 to the upper portion of the front leg 22 as will be described in further detail below.

The flex shield 30 also includes a flexible and resilient cord 44, such as a bungee cord, having a proximal end fixedly secured to the bottom edge 40 of the body portion 32 and an opposite distal end fixedly secured to a mounting plate 46. An elongated elastic upper strap 48 extends from a proximal end fixedly secured to the rear edge 36 of the body portion 32 adjacent the top edge 38 thereof and to an opposite distal end fixedly secured to a plastic or metal j-hook type upper clip 50. Finally, an elongated elastic lower strap 52 extends from a proximal end fixedly secured to the front edge 34 of the body portion 32 adjacent the bottom edge 40 thereof to an opposite distal end fixedly secured to a plastic or metal j-hook type lower clip 54. The lower strap 52 extends underneath and through a webbing strap 56 having opposing ends fixed secured, or sewn, to the body portion 32 adjacent the rear edge 36 thereof to hold the lower strap 52 flat against the body portion 32 between the front edge 34 and rear edge 36.

Each of the edges 34, 36, 38, 40 of the body portion 32 are covered, closed and sealed by a binding tape 58, or dielectrically sealed edge, to provide a smooth and finished edge to the flex shield 30. Further, each of the ends of the cord 44, upper strap 48, and lower strap 52 may be fixedly secured to the body portion 32 by thread sewing or dielectrically sealed into the respective edges. Similarly, the upper clip 50, lower clip 54 and mounting plate 46 may be sewn to the respective distal ends of the upper strap 48, lower strap 52 and bungee cord 44.

Finally, the flex shield 30 includes a plurality of pre-formed crease or fold lines 60 extending diagonally from the front edge 34 of the body portion 32 to the rear edge 36 and/or bottom edge 40. As best shown in FIG. 5, in the preferred embodiment, the flex shield 30 includes 3 spaced apart predetermined or pre-formed fold lines 60', 60", 60''' creating natural breaks in the flex shield 30. A first fold line 60' extends diagonally between the front edge 34 and the rear edge 36, a second fold line 60" extends diagonally between the front edge 34 and the corner formed between the rear edge 36 and bottom edge 40 and a third fold line 60''' extends diagonally between the front edge 34 and the bottom edge 40. It should be appreciated, however, that the number and position of the fold lines 60 may vary as desired. The fold lines 60 in the preferred embodiment are formed by a threaded stitch line through and along the material of the body portion 32; however, it should be appreciated that the fold lines 60 may be formed by other means such as perforations or indentations in the flexible material. The fold lines 60 allow the flex shield 30 to predictably and consistently fold between an unfolded position shown in FIG. 2 when the seat assembly 10 is in the seating position and a folded position folded in an accordion type fashion upon itself during movement of the seat assembly 10 from the seating position to the easy-entry or stowed positions as shown in FIGS. 7 and 8.

Figure 3:
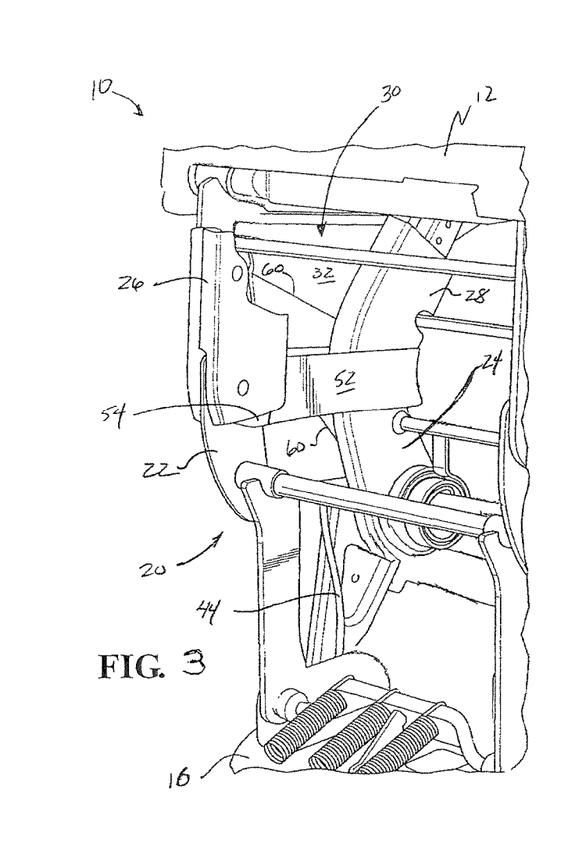
FIG. 3 is a fragmentary perspective view of the flex shield coupled to the riser assembly.
Figure 4:
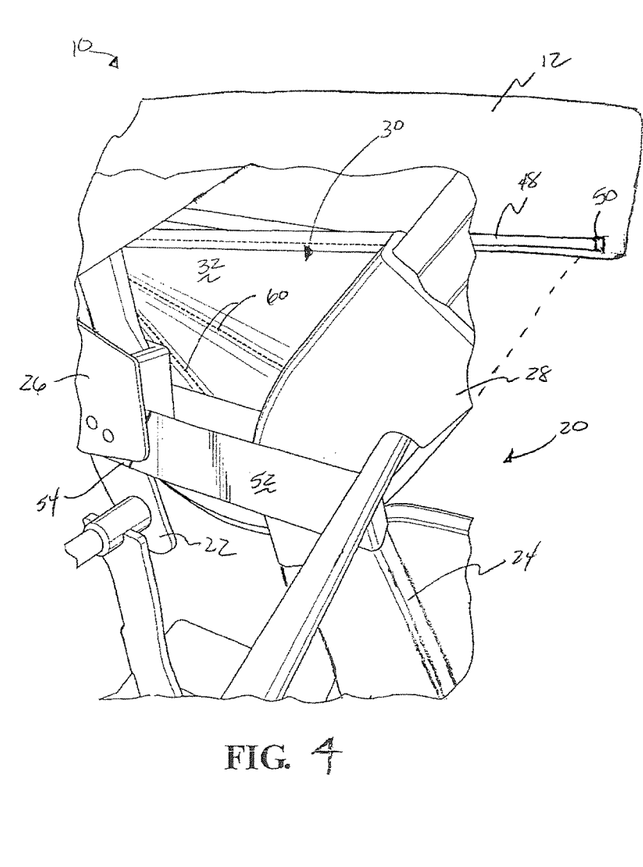
FIG. 4 is a fragmentary perspective view of the flex shield coupled to the seat cushion and rear leg of the riser assembly.

Referring now to FIGS. 2-4, the flex shield 30 is shown operatively coupled to the seat assembly 10. The front edge 34 of the body portion 32 is fixedly secured to the upper portion of the front leg 22 and fixedly secured in place by the front shield 26 being fastened through the openings 42 along the front edge 34 of the body portion 32. The top edge 38 of the flex shield 30 extends horizontally along and parallel to the bottom edge of the seat cushion 12 to the rear legs 24. The bungee cord 44 extends from the bottom edge 40 of the flex shield 30 to the floor 18 and is fixedly secured by bolting or screws to either the floor 18 or the mounting plate 16. The bungee cord 44 is elastic and maintains tension on the bottom edge 40 of the body portion 32 to pull the bottom edge 40 towards the floor 18. Referring specifically to FIGS. 3 and 4, the upper strap 48 extends from the rear edge 36 of the flex shield 30 along the seat cushion 12 and the upper j-hook clip 50 is fastened to a portion, such as a slot or lip, on the frame of the seat cushion 12 to maintain tension along the top edge 38 and rear edge 36 of the body portion 32 and thus continuously cover the rear leg 24. Finally, the lower strap 52 extends around the rear leg 24 and the lower j-hook clip 54 is fastened or hooked around the front leg 22 to maintain the position of flex shield 30 against both the front and rear legs 22, 24.

In operation, the upper strap 48, lower strap 52 and elastic bungee cord 44 maintain tension on the body portion 32 of the flex shield 30 to keep the flex shield 30 flat and in the unfolded position, covering the open side portion of the seat assembly 10 below the seat cushion 12 and covering the upper portions of the front and rear legs 22, 24 of the riser assembly 20 when the seat assembly 10 is in the seating position. When the seat assembly 10 is actuated to either the easy-entry or stowed positions, as shown in FIGS. 7 and 8, wherein the seat assembly 10 is pivoted by the front and rear legs 22, 24 forwardly and downward, the pre-formed fold lines 60', 60", 60''' allow the body portion 32 of the flex shield 30 to predictably and consistently fold along the fold lines 60', 60", 60"' as the seat assembly 10 collapses towards the floor 18 of the vehicle. The effective distance between the front legs 22 and rear legs 24 increases during movement from the seating position to the easy-entry or stowed position; thereby elastically stretching the upper strap 48, lower strap 52, and bungee cord 44. The elasticity of the upper and lower straps 48, 52 and the bungee cord 44 maintains tension on the body portion 32 to retain the flex shield 30 against the front and rear legs 22, 24 while the body portion 32 collapses to the folded position as shown in FIGS. 7 and 8.

The invention has been described in an illustrative manner, and it is to be understood that the terminology which has been used is intended to be in the nature of words of description rather than of limitation. Many modifications and variations of the present invention are possible in light of the above teachings. It is, therefore, to be understood that within the scope of the appended claims, the invention may be practiced other than as specifically described.

What is claimed:

1. A flex shield adapted to be operatively coupled to a seat assembly of an automotive vehicle, wherein the seat assembly comprises a seat cushion, and front and rear legs extending and exposed above a floor of the automotive vehicle, and the flex shield is coupled to the seat assembly under the seat cushion to conceal open sides of the seat assembly below the seat cushion, said flex shield comprising:
    a flexible planar body portion extending laterally between a front edge and a rear edge and vertically between an upper edge and a lower edge;
    a plurality of elastic straps fixedly secured to said body portion and adapted to be coupled to the seat assembly for maintaining tension on the flexible body portion; and
    a plurality of pre-formed fold lines formed in said body portion and extending between at least one of said front edge and rear edge for consistently controlling folding motion of said body portion between an unfolded position defining a generally planar body portion and a folded position wherein the body portion is collapsed along said fold lines;
    wherein said plurality of elastic straps includes an upper strap extending between a proximal end fixedly secured to said rear edge of said body portion and an opposite distal end spaced from said rear edge and adapted to be coupled to the seat assembly.

2. The flex shield as set forth in claim 1 wherein said pre-formed fold lines include at least one predetermined threaded stitch line extending between said front edge and said rear edge of said body portion.

3. The flex shield as set forth in claim 1 wherein said plurality of elastic straps includes a lower strap extending between a proximal end fixedly secured to said front edge of said body portion and an opposite distal end adapted to be coupled to the seat assembly.

4. The flex shield as set forth in claim 3 wherein said plurality of elastic straps includes an elastic cord extending between a proximal end fixedly secured to the bottom edge of said body portion and an opposite distal end adapted to be coupled to the seat assembly.

5. The flex shield as set forth in claim 4 wherein said body portion includes at least one opening therethrough along the front edge adapted to fixedly secure the body portion to the seat assembly.

6. A seat assembly for use in an automotive vehicle, said seat assembly comprising:
    a seat cushion;
    a seat back operatively coupled to said seat cushion;
    a riser assembly operatively coupled between the seat cushion for supporting the seat assembly above a floor of the vehicle, said riser assembly including a pair of front legs pivotally coupled to said seat cushion and a pair of rear legs pivotally coupled to said seat cushion for providing movement of said seat assembly between an upright seating position and at least one stowed position; and
    a flex shield operatively coupled to the seat assembly under the seat cushion to conceal open sides of the seat assembly below the seat cushion portion of the seat assembly, said flex shield including a flexible planar body portion extending laterally between a front edge and a rear edge and vertically between an upper edge and a lower edge, a plurality of elastic straps fixedly secured to said body portion and adapted to be coupled to the seat assembly for maintaining tension on the flexible body portion, and a plurality of pre-formed fold lines formed in said body portion and extending between at least one of said front edge and rear edge for consistently controlling folding motion of said body portion between an unfolded position defining a generally planar body portion and a folded position wherein the body portion is collapsed along said fold lines during actuation of said seat assembly between said seating and stowed positions;
    wherein said pre-formed fold lines include at least one predetermined threaded stitch line extending between said front edge and said rear edge of said body portion; and
    wherein said plurality of elastic straps includes an upper strap extending between a proximal end fixedly secured to said rear edge of said body portion and an opposite distal end spaced from said rear edge and fixedly secured to said seat cushion.

7. The seat assembly as set forth in claim 6 wherein said plurality of elastic straps includes a lower strap extending between a proximal end fixedly secured to said front edge of said body portion and an opposite distal end coupled to the said riser assembly.

8. The seat assembly as set forth in claim 7 wherein said plurality of elastic straps includes an elastic cord extending between a proximal end fixedly secured to the bottom edge of said body portion and an opposite distal end adapted to be coupled to the said riser assembly.

9. The seat assembly as set forth in claim 7 wherein said body portion includes at least one opening therethrough along the front edge for fixedly securing the body portion to the said riser assembly.

10. A flex shield adapted to be operatively coupled to a seat assembly of an automotive vehicle, wherein the seat assembly comprises a seat cushion, and front and rear legs extending and exposed above a floor of the automotive vehicle, and the flex shield is coupled to the seat assembly under the seat cushion to conceal open sides of the seat assembly below the seat cushion, said flex shield comprising:
    a flexible planar body portion extending laterally between a front edge and a rear edge and vertically between an upper edge and a lower edge;
    a plurality of elastic straps fixedly secured to said body portion and adapted to be coupled to the seat assembly for maintaining tension on the flexible body portion; and a plurality of pre-formed fold lines formed in said body portion and extending between at least one of said front edge and rear edge for consistently controlling folding motion of said body portion between an unfolded position defining a generally planar body portion and a folded position wherein the body portion is collapsed along said fold lines;

wherein said plurality of elastic straps includes an upper strap extending between a proximal end fixedly secured to said rear edge of said body portion and an opposite distal end spaced from said rear edge and adapted to be coupled to the seat assembly; and wherein said pre-formed fold lines include at least one predetermined threaded stitch line extending between said front edge and said rear edge of said body portion.

11. The flex shield as set forth in claim 10 wherein said plurality of elastic straps includes a lower strap extending between a proximal end fixedly secured to said front edge of said body portion and an opposite distal end adapted to be coupled to the seat assembly.

12. The flex shield as set forth in claim 11 wherein said plurality of elastic straps includes an elastic cord extending between a proximal end fixedly secured to the bottom edge of said body portion and an opposite distal end adapted to be coupled to the seat assembly.

13. The flex shield as set forth in claim 12 wherein said body portion includes at least one opening therethrough along the front edge adapted to fixedly secure the body portion to the seat assembly.

\* \* \* \* \*